(12) United States Patent
Jolly et al.

(10) Patent No.: US 8,131,076 B2
(45) Date of Patent: Mar. 6, 2012

(54) EDITING OF PRE-SEGMENTED IMAGES USING SEEDS DERIVED FROM CONTOURS

(75) Inventors: Marie-Pierre Jolly, Hillsborough, NJ (US); Leo Grady, Yardley, PA (US)

(73) Assignee: Siemens Aktiengesellschaft, München (DE)

( * ) Notice: Subject to any disclaimer, the term of this patent is extended or adjusted under 35 U.S.C. 154(b) by 1056 days.

(21) Appl. No.: 12/031,966

(22) Filed: Feb. 15, 2008

(65) Prior Publication Data
US 2008/0310716 A1 Dec. 18, 2008

Related U.S. Application Data

(60) Provisional application No. 60/943,901, filed on Jun. 14, 2007.

(51) Int. Cl.
*G06K 9/34* (2006.01)
(52) U.S. Cl. ......... 382/173; 382/180
(58) Field of Classification Search ......... 382/128–132, 382/173, 180
See application file for complete search history.

(56) References Cited

U.S. PATENT DOCUMENTS

| | | | | |
|---|---|---|---|---|
| 5,898,793 | A * | 4/1999 | Karron et al. | 382/131 |
| 6,078,688 | A * | 6/2000 | Cox et al. | 382/173 |
| 6,973,212 | B2 | 12/2005 | Boykov et al. | |
| 7,079,673 | B2 * | 7/2006 | Foran et al. | 382/128 |
| 7,565,000 | B2 * | 7/2009 | Capolunghi et al. | 382/128 |
| 7,668,349 | B2 * | 2/2010 | Fradkin et al. | 382/120 |
| 7,864,994 | B2 * | 1/2011 | Fidrich et al. | 382/128 |
| 7,876,939 | B2 * | 1/2011 | Yankelevitz et al. | 382/128 |
| 2004/0202369 | A1 * | 10/2004 | Paragios | 382/173 |
| 2006/0147126 | A1 | 7/2006 | Grady | |
| 2007/0025616 | A1 | 2/2007 | Grady et al. | |
| 2007/0116334 | A1 * | 5/2007 | Fidrich et al. | 382/128 |
| 2007/0189590 | A1 * | 8/2007 | Fidrich et al. | 382/128 |

OTHER PUBLICATIONS

Saban et al Interactive Segmentation using curve Evolution and relevance feedback, International Conference on Image Processing—ICIP, pp. 2725-2728, 2004.*
Grady et al Multilabel image segmentation for medical applications based on graph-theoretic electric potentials Proceedings of the 8th ECCV04, Workshop on computer vision approaches to medical image analysis and mathematical methods in biomedical image analysis 2004.*
Boykov et al Interactive graph cuts for optimal boundary and region segmentation of objects in N-D images Computer Vision ICCV 2001. Proceedings. Eighth IEEE International Conference 2001.*
Grady et al., "An Energy Minimizaton Approach to the Data Driven Editing of Presegmented Images/Volume", Proceedings of Medical Image Computing and Computer-Assisted Invervention—MICCAI 2006, pp. 888-895.
Grady, Leo, "Random Walks for Image Segmentation", IEEE Transactions on Pattern Analysis and Machine Intelligence, vol. 28, No. 11, Nov. 2006, pp. 1768-1783.

* cited by examiner

*Primary Examiner* — Bhavesh Mehta
*Assistant Examiner* — Sean Motsinger
(74) *Attorney, Agent, or Firm* — Donald B. Paschburg; F. Chau & Associates, LLC

(57) ABSTRACT

A method for processing an object in image data includes the steps of drawing a contour on a pre-segmentation of an object in image data, generating at least one seed point on the pre-segmentation from an intersection of the contour and the pre-segmentation, providing a weighting factor between the seed points and the pre-segmentation, and segmenting the pre-segmentation using the seed points and the weighting factor to generate a new pre-segmentation.

16 Claims, 7 Drawing Sheets

Background seeds

000
EDITING OF PRE-SEGMENTED IMAGES USING SEEDS DERIVED FROM CONTOURS

CROSS-REFERENCE TO RELATED APPLICATIONS

This application claims priority to U.S. Provisional Application No. 60/943,901, filed on Jun. 14, 2007, the disclosure of which is incorporated by reference herein.

BACKGROUND OF THE INVENTION

1. Technical Field

The present disclosure relates to the segmentation of anatomical structures and more particularly the use and editing of previously incomplete or incorrect segmentation of structures to achieve a correct segmentation.

2. Discussion of Related Art

Medical images, such as computed tomography (CT) and magnetic resonance imaging (MRI) scans, can be segmented to emphasize an object of interest. In a segmentation, pixels are marked as either representing the object of interest or as representing material that lies outside the object of interest. Conventional methods that provide automatic segmentation are not always reliable and can often produce results that include erroneous such markings. Therefore, means of editing the segmentation results (e.g., the pre-segmented image) is necessary. Some conventional editing methods require a user to select foreground and background seed points on the pre-segmented image. The foreground seed points represent points that should have been marked as belonging to the object of interest in the pre-segmented image. The background seed points represent points that should have been marked as lying outside the object of interest in the pre-segmented image. A conventional editing segmentation process, such as one that uses a Graph Cuts or Random Walker method, can then be applied to the seed points and the pre-segmented image to produce a more accurate segmentation.

Since Radiologists are already used to outlining objects of interest in a 3D medical volume with contours, it would be desirable to be able to automatically derive the background and foreground seed points from the drawn contour lines without having a user individually paint them. Thus, there is a need for methods and systems of automatically deriving seed points from contours drawn on an pre-segmentation and editing or correcting the pre-segmentation using the derived seed points.

SUMMARY OF THE INVENTION

An exemplary embodiment of the present invention includes a method for processing an object of interest in image data. The method includes the steps of drawing a contour on a pre-segmentation of an object, generating at least one seed point on the pre-segmentation from an intersection of the contour and the pre-segmentation, determining a weighting factor between the seed points and the pre-segmentation, and segmenting the pre-segmentation using the seed points and the weighting factor to generate a new pre-segmentation.

The seed points may include at least one of a foreground seed point and a background seed point. The foreground seed point represents a point of the object and the background seed point represents a point outside the object.

The step of generating at least one seed point on the pre-segmentation from an intersection of the contour and the pre-segmentation may include the steps of determining whether the contour is open or closed, generating at least one of a foreground seed point inside the closed contour and a background seed point outside the closed contour, determining whether the open contour is inside or outside the object, generating at least one foreground seed point inside the open contour when it is determined that the open contour is outside the object, and generating at least one background seed point in a part of the object formed by an intersection of the open contour and the object when it is determined that the open contour is inside the object.

The contour may be determined to be open when a distance between the first point of the contour and the last point of the contour is more than a threshold value. The step of segmenting may be performed using a Graph Cuts or a Random Walker method. The weighting factor may be a function of the distance between the pre-segmented object and the at least one seed point. The method may be repeated iteratively by drawing new contours on the resulting pre-segmentation until a threshold level of quality has been reached.

An exemplary embodiment of the present invention includes a method for generating seed points to be used with a segmentation process. The method includes the steps of drawing a contour on a pre-segmentation of an object of interest, and generating at least one seed point on the pre-segmentation from an intersection of the contour and the pre-segmentation.

The seed points may include at least one of a foreground seed point and a background seed point. The foreground seed point represents a point of the object and the background seed point represents a point outside the object.

The step of generating at least one seed point on the pre-segmentation from an intersection of the contour and the pre-segmentation may include generating at least one of a foreground seed point inside the contour and a background seed point outside the contour when it is determined that the contour is closed.

The step of generating at least one seed point on the pre-segmentation from an intersection of the contour and the pre-segmentation may alternately or additionally include generating at least one foreground seed point inside the contour when it is determined that the contour is open and outside the object.

The step of generating at least one seed point on the pre-segmentation from an intersection of the contour and the pre-segmentation may alternately or additionally include generating at least one background seed point in a part of the object formed by an intersection of the contour and the object when it is determined that the contour is open and inside the object. The segmentation process may includes a graph cuts method or a random walker method.

An exemplary embodiment of the present invention includes a system for segmenting an object of interest in image data. The system includes a processor, a display, a pointing device, and computer software. The display is for displaying a pre-segmentation of an object in image data. The pointing device is for drawing a contour on the displayed pre-segmentation. The computer software is operable on the processor. The computer software includes instructions for generating at least one seed point on the pre-segmentation from an intersection of the drawn contour and the pre-segmentation, generating a weighting factor between the seed points and the pre-segmentation, and segmenting the pre-segmentation using the seed points and the weighting factor to generate a new pre-segmentation.

The instructions for generating at least one seed point on the pre-segmentation from an intersection of the drawn contour and the pre-segmentation may include instructions for determining whether the contour is open or closed, generating at least one of a foreground seed point inside the closed contour and a background seed point outside the closed contour, determining whether the open contour is inside or outside the object, generating at least one foreground seed point inside the open contour when it is determined that the open contour is outside the object, and generating at least one background seed point in a part of the object formed by an intersection of the open contour and the object when it is determined that the open contour is inside the object.

The instruction for the segmentation may include instructions for performing a Graph cuts method or a Random Walker method. The weighting factor may be a function of the distance between the pre-segmented object and at least one seed point.

These and other exemplary embodiments of the present invention will be described or become more apparent from the following detailed description of exemplary embodiments, which is to be read in connection with the accompanying figures.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

In general, exemplary embodiments for systems and methods of automatically deriving seed points from contours drawn on an image and editing or correcting pre-segmentations using the derived seed points will now be discussed in further detail with reference to illustrative embodiments of FIGS. 1-5.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
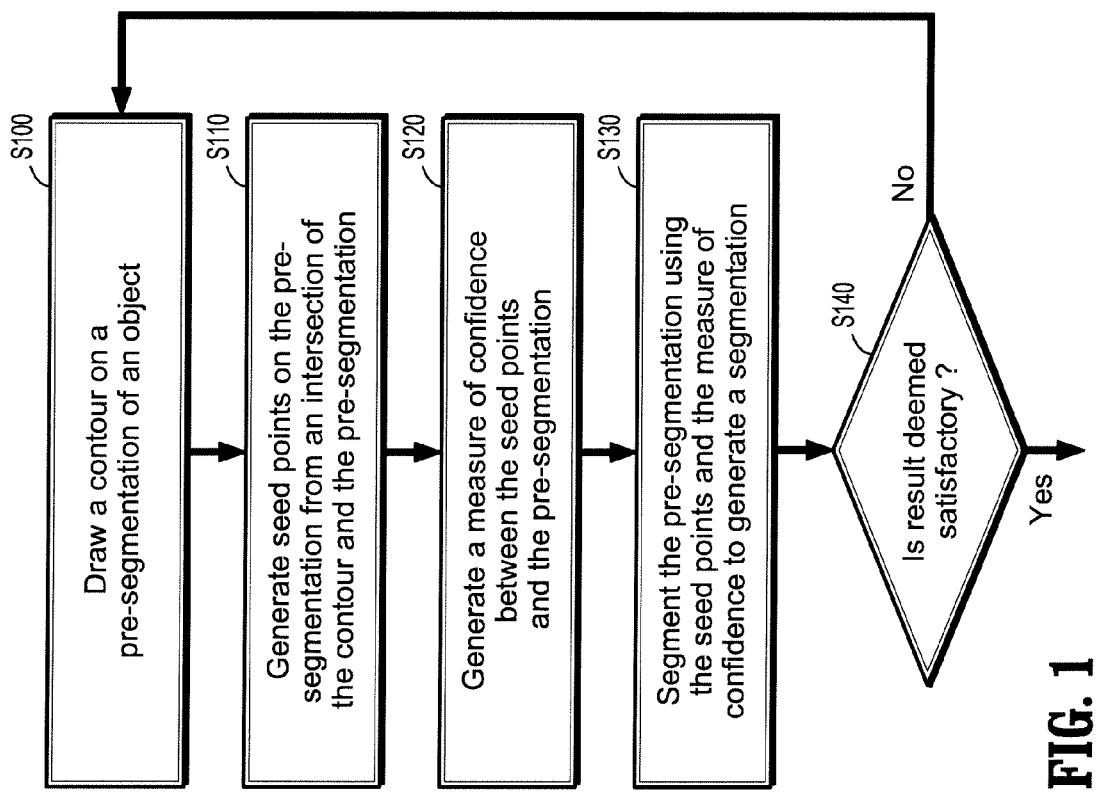
FIG. 1 illustrates a method for processing an object of interest in image data according to an exemplary embodiment of the present invention.

FIG. 1 illustrates a method for processing an object of interest in image data according to an exemplary embodiment of the present invention that can be used to correct errors in a pre-segmentation. Referring to FIG. 1, in an initial step (S100), a contour is drawn on a pre-segmentation of an object (S100). For example, a user, such as a physician, may view the pre-segmentation on a computer display and use a pointing device to draw the contour on the displayed pre-segmentation. In a next step (S110), at least one seed point is generated on the pre-segmentation from an intersection of the contour and the pre-segmentation (S110).

Figure 2:
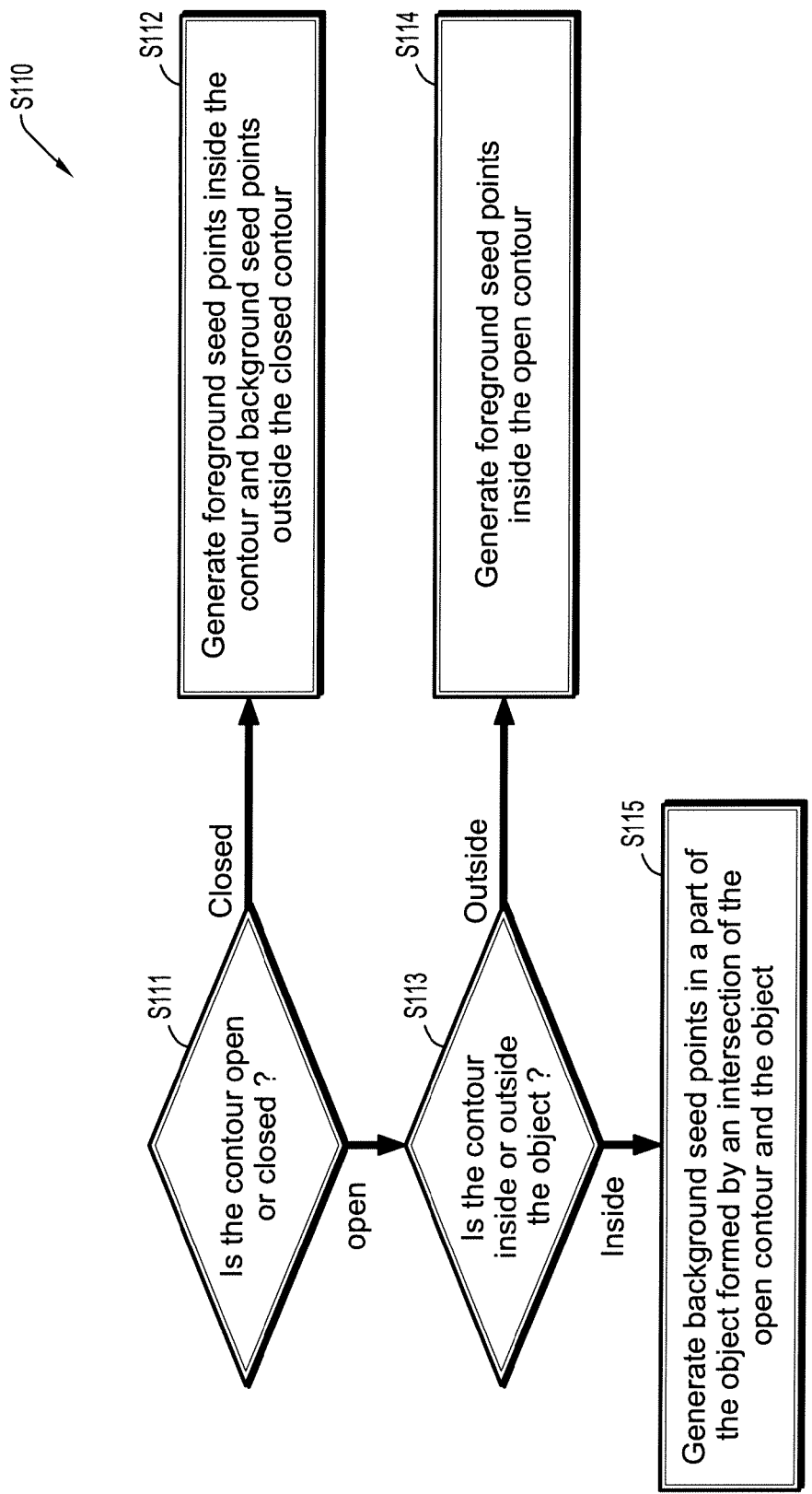
FIG. 2 illustrates a method for generating seed points to be used with a segmentation process according to an exemplary embodiment of the present invention.

The step (S110) of generating the seed points from the intersection of the contour is preferably performed by analyzing a 2D slice of the pre-segmentation. The pre-segmentation can be sliced into 2D slices at any desired plane orientation and is not limited to being one of the major MPRs. The step (S110) may be performed by the method illustrated in FIG. 2. Referring to FIG. 2, in an initial step (S111), it is determined whether the contour is open or closed.

Figure 3A:
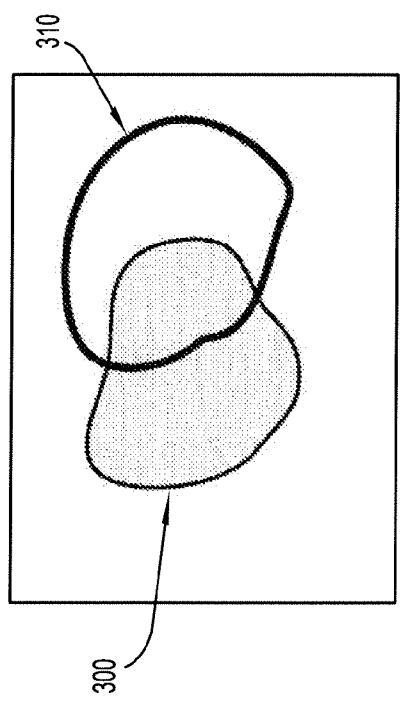
FIG. 3a illustrates a pre-segmentation with a closed contour and FIG. 3b illustrates seed points derived from the contour according to an exemplary embodiment of the present invention.
Figure 3B:
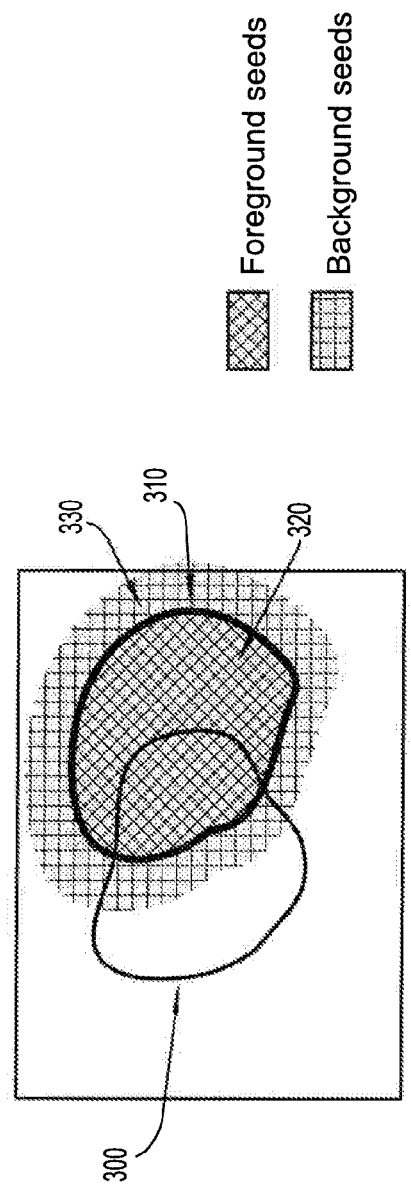
Figure 3C:
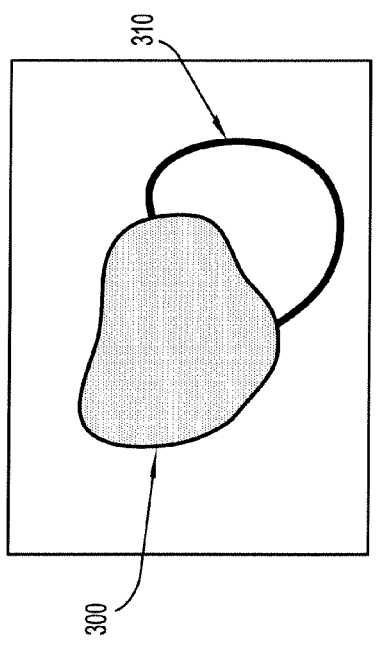
FIG. 3c illustrates a pre-segmentation with an open contour outside a pre-segmented object and FIG. 3d illustrates seed points derived from the contour according to an exemplary embodiment of the present invention.
Figure 3D:
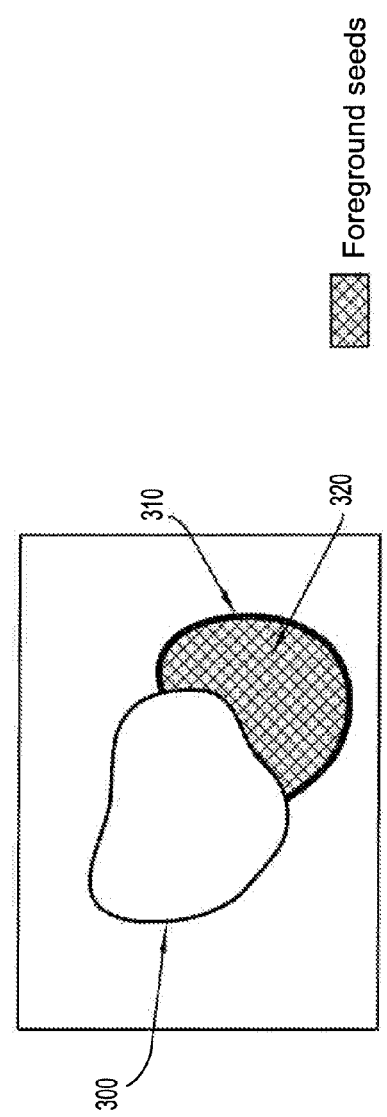
Figure 3E:
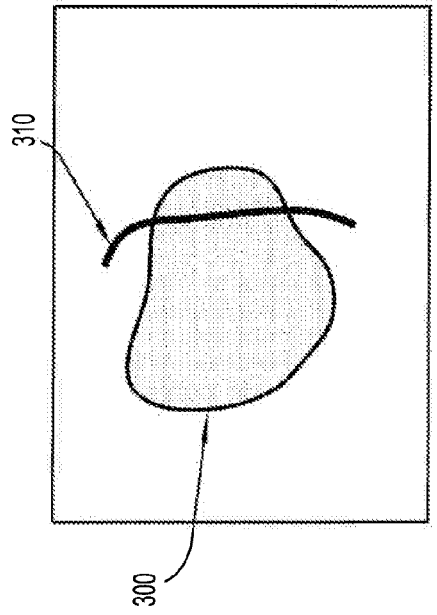
FIG. 3e illustrates a pre-segmentation with an open contour inside a pre-segmented object and FIG. 3f illustrates seed points derived from the contour according to an exemplary embodiment of the present invention.

The contour 310 can be determined to be open or closed by obtaining the distance between the first and last point on the contour 310. If the distance is smaller than a pre-determined threshold, the contour 310 can be assumed to be closed. If the distance is greater than the pre-determined threshold, the contour 310 can be assumed to be open. FIG. 3a illustrates a pre-segmentation of an object of interest 300 with a closed contour 310. FIGS. 3c and 3e illustrate pre-segmentations of an object of interest 300 with an open contour 310.

If the contour 310 was determined to be closed, one or more foreground seed points are generated inside the contour 310 and/or one or more background seed points are generated outside the closed contour 310 in a subsequent step (S112). FIG. 3b illustrates the pre-segmentation of the object of interest 300 with a closed contour 310, and areas 320 and 330 respectively representing corresponding generated foreground and background seed points.

If the contour 310 was instead determined to be open, it is determined whether the contour 310 is inside or outside the object of interest 300 in a subsequent step (S113). The contour 310 can be determined to be inside or outside the object of interest 310 by trimming the contour 310 so that its end points coincide with the object of interest 300 and then by determining a point on the contour 310 that is farthest from the object of interest 300. If the point is outside the object of interest 300, the contour 310 may be assumed to be outside the object of interest 300. FIG. 3c illustrates a contour 310 that is open and outside the object of interest 300. Alternately, if the point is inside the object of interest 300, the contour 310 may be assumed to be inside the object of interest 300. FIG. 3e illustrates a contour 310 that is open and inside the object of interest 300.

If the contour 310 was determined to be outside the object of interest 300, foreground seed points are generated inside the open contour in a subsequent step (S114). FIG. 3d illustrates the pre-segmentation of the object of interest 300 with an open contour 310 and an area 320 representing the generated foreground seed points.

Figure 3F:
Figure 3F:
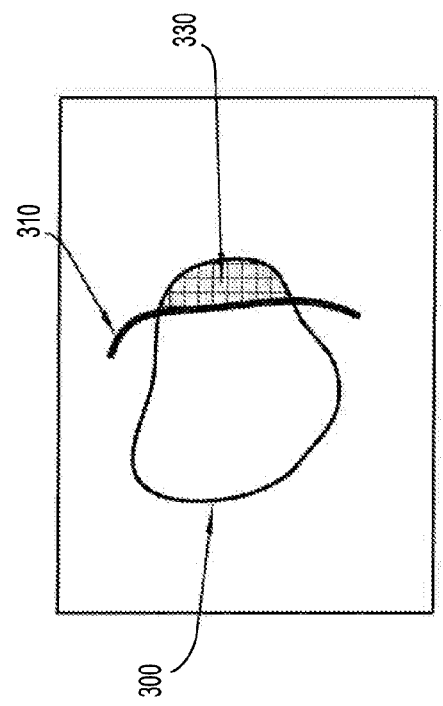

If the open contour 310 was instead determined to be inside the object of interest 300, background seed points are generated in a part of the object of interest 300 formed by an intersection of the open contour 310 and the object of interest 300 in a subsequent step (S115). The intersection of the contour 310 and the object of interest 300 form two parts. The background seed points are generated in a chosen one of the two parts. The part may be chosen based on predefined rules. The rules may include choosing the part based on its area or its relative position to the contour. For example, the part having the smallest or largest area may be chosen or the part positioned to the right or left of the contour may be chosen. FIG. 3f illustrates the pre-segmentation of the object of interest 300 with an open contour 310 inside the object of interest 300 and an area 330 representing the generated background seed points.

The contour 310 can be drawn in multiple planes and then the seed points can be generated all at once. However, if the resulting seed points conflict (e.g., a voxel contains both background and foreground seed points), the conflicting seed points should be removed.

In a next step (S120), a measure of confidence (e.g., a strength or a weight) γ between the seed points and the pre-segmentation is determined. The measure of confidence γ is a function of the distance between the seed points and the pre-segmentation and may be defined by the following equation:

$$\gamma = k \exp\left(\frac{d(v_i, v_j)}{\sigma}\right) \quad (1)$$

where $d(v_i, v_j)$ is the minimum distance from all vertices $v_i$ of the pre-segmented object to all vertices $v_j$ of the background and foreground seed points, k is a parameter that indicates the overall strength of consideration given to the pre-segmentation, and σ is a parameter that controls the locality of the modification given by the seed points.

Figure 4:
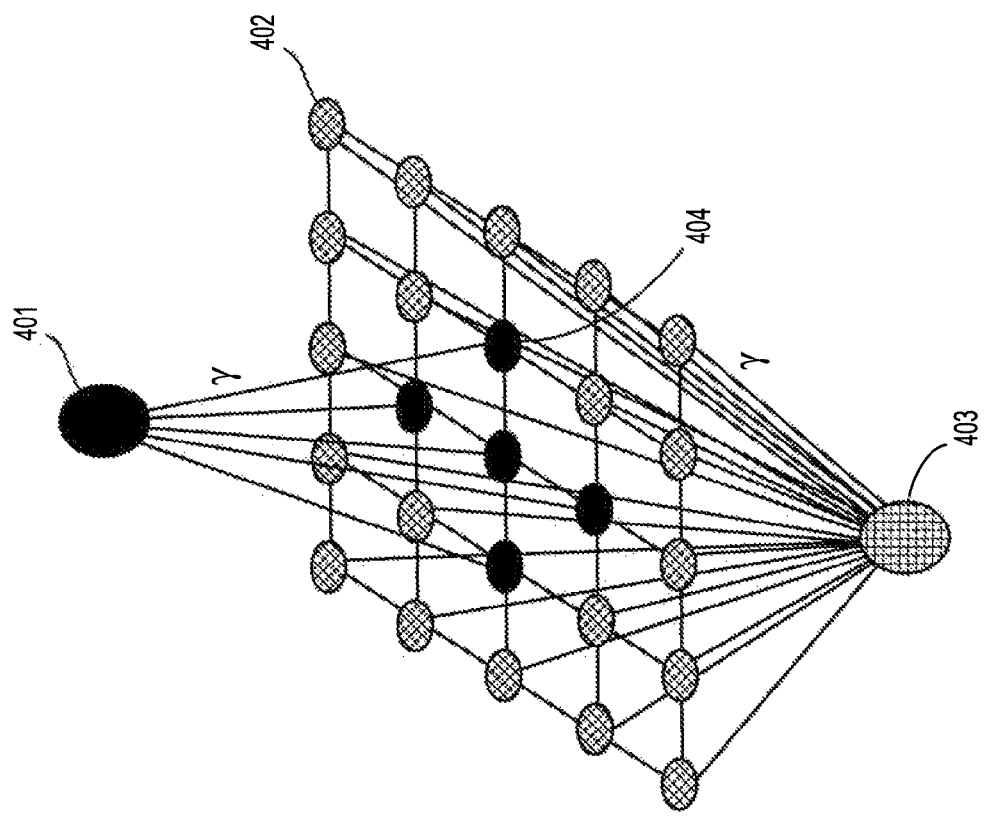
FIG. 4 illustrates a graph of a pre-segmentation.

In a next step (S130), the pre-segmentation is segmented using the seed points and the measure of confidence γ to generate a new segmentation. As shown in FIG. 4, each pixel (e.g., voxel) of the pre-segmentation is associated with a node in a graph and the nodes are connected with edges if the corresponding pixels are neighbors. The foreground nodes (such as 404) of the pre-segmented object are connected to the foreground super-node 401 with measure of confidence γ and the background nodes (such as 402) of the pre-segmented object are connected to the background super-node 403 with measure of confidence γ. The foreground and background seed points are then placed on the graph as nodes and connected respectively to corresponding foreground and background super-nodes 401 and 403. A Graph Cuts method or Random Walker method may then be run to segment the pre-segmentation to produce the new segmentation.

In a Graph Cuts method, edges connected to the super-nodes are referred to as t-links. An infinite cost is assigned to all t-links connected to seeds. Pairs of neighboring pixels are connected by weighted edges that are referred to as n-links. Costs are assigned to each of the n-links based on a local intensity gradient, a Laplacian zero-crossing, a gradient direction, or some other criteria. It is preferred that the costs be non-negative. One simple implementation incorporates undirected n-links {a,b} between neighboring pixels a and b with cost $w_{\{a,b\}} = f(|I_a - I_b|)$ where $I_a$ and $I_b$ are intensities at pixels a and b and $f(x) = K \exp(x^2/\sigma^2)$ is a non-negative decreasing function. Such weights encourage segmentation boundaries in places with a high intensity gradient.

In another implementation, which incorporates gradient direction h, directed n-links {a,b} between neighboring pixels a and b with cost $w_{\{a,b\}} = \max(0, f(|I_a - I_b|) + h*(I_a - I_b))$ are used. A positive gradient direction h forces dark pixels to stay inside the segmentation boundary and bright pixels to stay outside. A negative gradient direction h would achieve the opposite effect.

The segmentation boundary between the object and the boundary is determined by finding the minimum cost cut on the graph. A cut is a subset of edges that separates the foreground super-node 401 from the background super-node 403. The cost of the cut is the sum of its edge costs. For directed edges, the costs of the cut is the sum of severed edges {a,b}, where node a is left in the part of the graph connected to the foreground super-node 401 and node b is left in the part of the graph connected to the background super-node 403. Due to the infinite cost of t-links to seeds, a minimum cut is guaranteed to separate the object seeds (e.g., foreground seeds) from the background seeds.

In a Random Walker method, a segmentation can be obtained using a prior model of intensities. The graph is weighted by marking a set of the nodes $V_m$ and leaving a set of the nodes unmarked $V_u$, such that $V_m \cup V_u = V$ and $V_m \cap V_u = \{\}$. Each node $v_i \in V_m$ is labeled with a label from the set $G = \{g^1, g^2, \ldots, g^k\}$ having cardinality k=|G|. A node $v_i \in V_u$ is referred to as free because its label is not initially known. Assume that each node $v_i \in V_m$ has also been assigned a label $y_i \in G$. The Random Walker approach is to assign to each node $v_i \in V_u$ the probability $x_i^s$ that a random walker starting from that node first reaches a marked node $v_i \in V_m$ assigned to label $g^s$. The segmentation is then completed by assigning each free node to the label for which it has the highest probability, i.e., $y_i = \max$ over s of $x_i^s$.

In a final step (S140) of the method of FIG. 1, if the resulting segmentation is not found to be satisfactory, a user can draw a new contour on the resulting segmentation and re-execute the method. The method can be re-executed using new contours until a satisfactory result is generated.

Given a pre-segmentation p, a problem of editing the pre-segmentation is defined as the minimization of the following energy functional:

$$Q(x) = \sum_{e_{ij}} w_{ij}(x_i - x_j)^2 + \gamma\left(\sum_i (1 - p_i)x_i + \sum_i p_i(1 - x_i)\right), \quad (2)$$

with respect to the foreground indicator function x, defined on the nodes, where the measure of confidence γ indicates the strength of the pre-segmentation and $w_{ij}$ defines an affinity weighting between pixels. The functional encourages the pre-segmentation and a data-driven smoothness in the form of the first term. Note that, with a sufficiently large measure of confidence γ, the pre-segmentation will always be returned. Given a user-defined editing set of nodes (possibly empty) marked as foreground seeds $F \subset V$ and a user-defined editing set of nodes (possibly empty) marked as background seeds $B \subset V$, such that $F \cap B = 0$, the seeds are incorporated into the minimization of equation 2 by performing a constrained minimization of Q(x) with respect to the following constraints:

$$x_i = \begin{cases} 1 & \text{if } Vi \subset F, \\ 0 & \text{if } Vj \subset B. \end{cases} \quad (3)$$

If the minimization of Q(x) in equation 2 is forced to give a binary valued optimum x for all unseeded nodes, then the minimization of equation 2 is given by the Graph Cuts method. For example, seeds are given by F, B, n-links have weight $w_{ij}$ and each node $v_i$ is connected via a t-link to a foreground super-node 401 or a background super-node 403 with weight γ. If the optimization of equation 2 is performed with respect to a real valued x, the Random Walker method may be performed with the same weighted graph.

Figure 5:
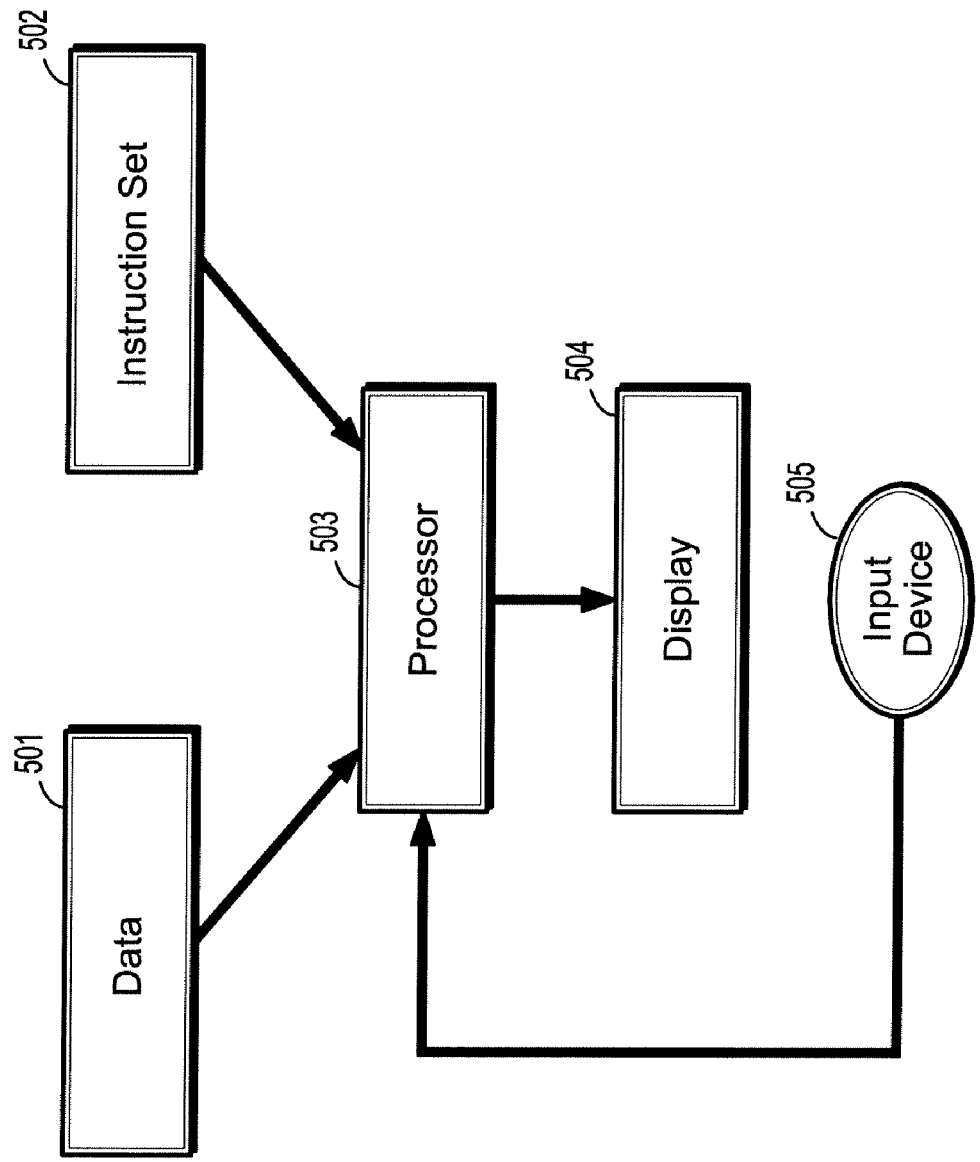
FIG. 5 illustrates a system for segmenting an object of interest in image data according to an exemplary embodiment of the present invention.

FIG. 5 illustrates a system for segmenting an object in a set of image data according to an exemplary embodiment of the present invention. The segmentation editing methods that are part of the present invention can be executed by a system as shown in FIG. 5. The system is provided with data 501 representing image or volume data including the pre-segmentation data. An instruction set or program 502 executing the methods of the present invention, including a Graph Cuts and/or Random walker segmentation method, is provided and combined with the data in a processor 503, which can process the instructions of 502 applied to the data 501 and show a resulting image on a display 504. The processor 503 can be dedicated hardware. However, the processor can also be a CPU or any other computing device that can execute the instructions of 502. An input device 505 like a mouse, or track-ball, a key-board or other input device allows a user to select an initial pre-segmentation of an object, to draw contours on the pre-segmentation, or to adjust the confidence factor between added seeds and the pre-segmentation nodes. Consequently the system as shown in FIG. 5 provides an interactive system for editing a pre-segmentation.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method for processing an object of interest in image data, the method comprising the steps of:
    drawing a contour on a pre-segmentation of an object;
    generating at least one seed point on the pre-segmentation from an intersection of the contour and the pre-segmentation;
    determining a weighting factor between the seed points and the pre-segmentation; and
    segmenting the pre-segmentation using the seed points and the weighting factor to generate a new pre-segmentation,
    wherein the weighting factor is a function of the distance between the pre-segmentation and the at least one seed point.

2. The method of claim 1, wherein the seed points include at least one of a foreground seed point and a background seed point, wherein the foreground seed point represents a point of the object and the background seed point represents a point outside the object.

3. The method of claim 2, wherein the generating comprises:
    determining whether the contour is open or closed;
    generating the at least one foreground seed point inside the contour determined to be closed and the background seed point outside the contour determined to be closed;
    determining whether the contour determined to be open is inside or outside the pre-segmentation;
    generating the at least one foreground seed point inside the contour when the contour is determined to be open and the contour is determined to be outside the pre-segmentation; and
    generating the at least one background seed point in a part of the pre-segmentation formed by an intersection of the contour and the pre-segmentation when the contour is determined to be open and the contour is determined to be inside the pre-segmentation.

4. The method of claim 3, where the contour is determined to be open when a distance between a first point of the contour and a last point of the contour is more than a threshold value.

5. The method of claim 1, wherein the segmenting is performed using a Graph Cuts method.

6. The method of claim 1, wherein the segmenting is performed using a Random Walker method.

7. The method of claim 1, wherein the method is repeated iteratively by drawing new contours on the resulting pre-segmentation until a certain quality level has been reached.

8. A non-transitory computer readable medium tangibly embodying a program of instructions executable by a computer to perform method steps for generating seed points to be used with a segmentation process, the method steps comprising:
    drawing a contour on a pre-segmentation of an object; and
    generating at least one seed point on the pre-segmentation from an intersection of the contour and the pre-segmentation,
    wherein the generating comprises generating at least one of a foreground seed point inside the contour and a background seed point outside the contour when it is determined that the contour is closed,
    wherein the foreground seed point represents a point of the object and the background seed point represents a point outside the object.

9. A non-transitory computer readable medium tangibly embodying a program of instructions executable by a computer to perform method steps for generating seed points to be used with a segmentation process, the method steps comprising:
    drawing a contour on a pre-segmentation of an object; and
    generating at least one seed point on the pre-segmentation from an intersection of the contour and the pre-segmentation,
    wherein the generating comprises generating at least one foreground seed point inside the contour when it is determined that the contour is an open contour and the contour is outside the pre-segmentation,
    wherein the foreground seed point represents a point of the object.

10. A non-transitory computer readable medium tangibly embodying a program of instructions executable by a computer to perform method steps for generating seed points to be used with a segmentation process, the method steps comprising:
    drawing a contour on a pre-segmentation of an object; and
    generating at least one seed point on the pre-segmentation from an intersection of the contour and the pre-segmentation,
    wherein the generating comprises generating at least one background seed point in a part of the pre-segmentation formed by an intersection of the contour and the pre-segmentation when it is determined that the contour is an open contour and the contour is inside the pre-segmentation, wherein the background seed point represents a point outside the object.

11. The computer readable medium of claim 8, wherein the segmentation process includes a Graph Cuts method.

12. The computer readable medium of claim 8, wherein the segmentation process includes a Random Walker method.

13. A system for segmenting an object in image data, the system comprising:
   a processor;
   a memory;
   a display for displaying a pre-segmentation of an object of interest in image data;
   a pointing device for drawing a contour on the displayed pre-segmentation;
   computer software stored in the memory and operable on the processor, the computer software comprising instructions for:
      generating at least one seed point on the pre-segmentation from an intersection of the drawn contour and the pre-segmentation;
      providing a weighting factor between the seed points and the pre-segmentation; and
      segmenting the pre-segmentation using the seed points and the weighting factor to generate a new pre-segmentation,
   wherein the weighting factor is a function of the distance between the pre-segmentation and the at least one seed point.

14. The system of claim 13, wherein the generating comprises instructions for:
   determining whether the contour is open or closed;
   generating at least one of a foreground seed point inside the contour determined to be closed and a background seed point outside the contour determined to be closed;
   determining whether the contour determined to be open-is inside or outside the pre-segmentation;
   generating at least one foreground seed point inside the contour when the contour is determined to be open when the contour is determined to be outside the pre-segmentation; and
   generating at least one background seed point in a part of the pre-segmentation formed by an intersection of the contour and the pre-segmentation when the contour is determined to be open and the contour is determined to be inside the pre-segmentation.

15. The system of claim 13, wherein the instruction for the segmenting comprises instructions for performing a Graph Cuts method.

16. The system of claim 13, wherein the instruction for segmenting comprises instructions for performing a Random Walker method.

* * * * *